UNITED STATES PATENT OFFICE.

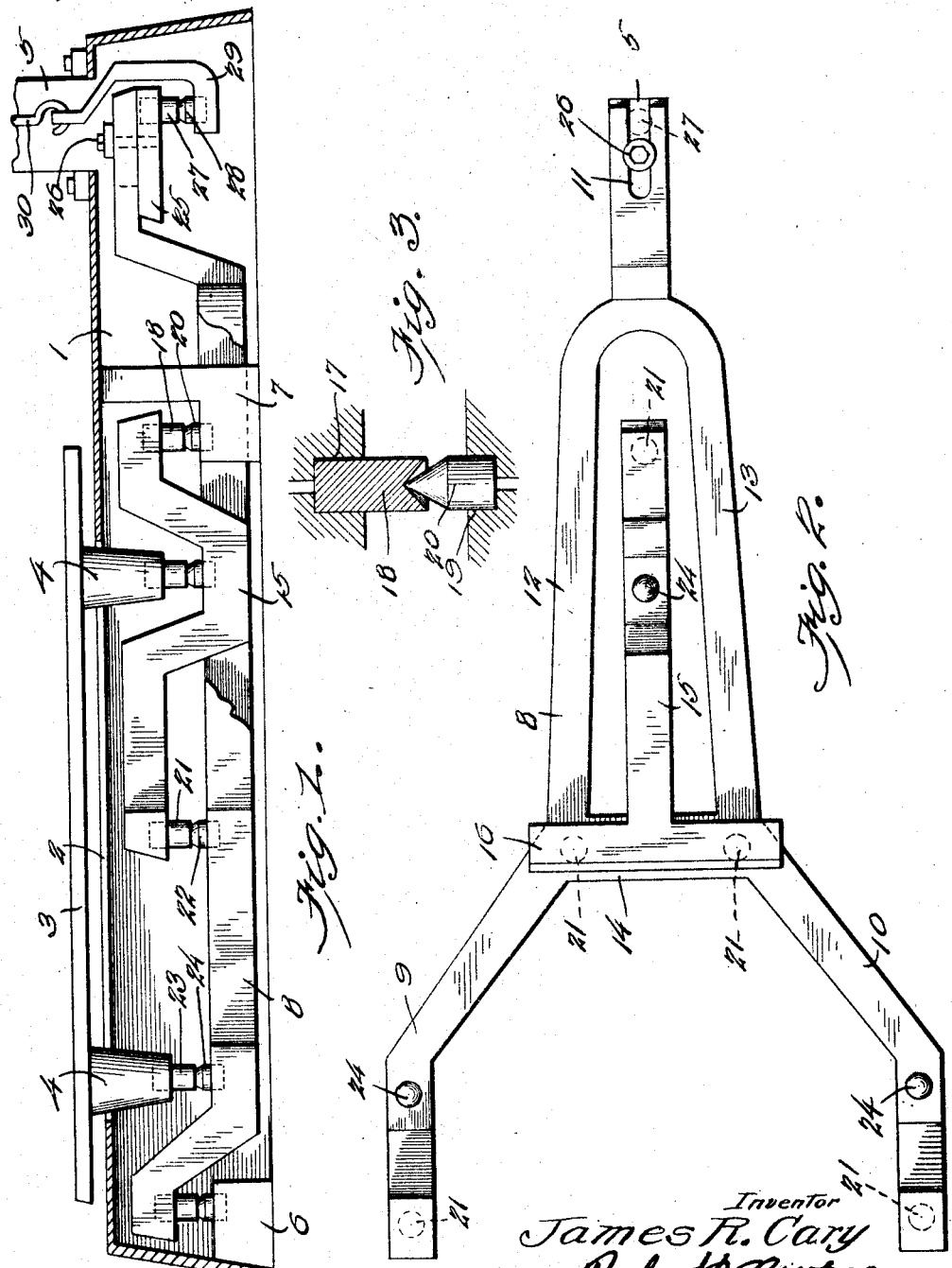

JAMES R. CARY, OF BINGHAMTON, NEW YORK.

SCALE.

1,282,187.  Specification of Letters Patent.  Patented Oct. 22, 1918.

Application filed July 27, 1917. Serial No. 183,152.

*To all whom it may concern:*

Be it known that I, JAMES R. CARY, a citizen of the United States, residing at Binghamton, in the county of Broome and State of New York, have invented certain new and useful Improvements in Scales, of which the following is a specification.

This invention relates to an improvement in scales, and particularly to scales of the platform type, and to a mounting for the platform.

An object of my invention is to provide a platform suspension which is of few parts and simple construction, and which at the same time obviates the necessity of using links or other parts operating and functioning in a like manner, thus making it possible to give a steadier mounting to the platform and to eliminate side swinging and the usual teetering movement of the platform, in this way not only making it possible to obtain accurate weights more expeditiously but also positively precluding the possibility of inaccurate weights being given through frictional bearing of the platform structure against any part of the frame or supporting structure.

A further object is to so construct the parts, and to provide bearings which are so arranged, that even when the scale is subjected to most severe usage, and when exposed to natural accumulation of dirt, grease, and the like, the accuracy in obtaining the finest measurements of weight will not be affected.

A still further object lies in providing bearings of such construction that they will accomplish the same purpose, in mounting the platform upon the scale levers, etc., as in the case of links as now employed, at the same time giving all necessary and desired movement, but which will guard against the usual side shifting and teetering movement of the platform now ordinarily attended upon the placing or removal of a load with respect to link suspended and other like platforms.

Yet another object is to provide means by which adjustment and correction can be made to calibrate the scale for accurate weighing.

With the above and other objects in view, which will be in part described and in part understood from the specification, drawings, and claims, my invention consists in certain novel features of construction and combinations of parts which will be hereinafter more fully set forth.

In the drawings:—

Figure 1 is a sectional view through a frame structure showing a platform mounted in accordance with my invention.

Fig. 2 is a top plan view of the mounting levers, and

Fig. 3 is a detail view partly in section to show the manner of making and assembling the bearings.

A frame 1 is provided with an opening 2, above which the weighing platform 3 is disposed, and this platform 3 has the legs 4 depending downwardly therefrom and received through the opening 2, it however being understood that sufficient clearance is given within the limits of the opening that the legs 4 do not have bearing with the frame. A pillar 5 is carried at one end of the frame, and the frame also has the bearing shelves 6 and 7 located somewhat below the plane of the top which has the opening 2 formed therethrough. In the present instance I have shown the platform 3 as having a three point mounting, and therefore the parts will be described as being constructed in a manner to accomplish this particular mounting, although it will be appreciated, as the description progresses, that variations might be resorted to in this connection and that a four point mounting, or the like, might be made.

To accomplish the mounting as described, the bearing shelves 6, of which two are provided, are spaced apart at one end of the frame 1, and the bearing shelf 7 is positioned substantially at practically the center of the frame and adjacent the opposite end of the opening 2. A long lever 8 terminates at one end in the branch arms 9 and 10, which are given sufficient spread that the spacing thereof corresponds substantially to the spacing of the bearing shelves 6, and the remaining end of this lever 8 is slotted or bifurcated as shown at 11. While the bifurcated end of the long lever 8 presents a single thickness, the body portion of this lever includes the side bars 12 and 13, which widen out into the branch arms 9 and 10, and a cross-bar 14 is provided at the point of juncture of the side portions 12 and 13 and the branch arms 9 and 10. A short lever 15 is provided with the branch arms 16, at one end thereof so that this short lever when viewed in plan has a substantially T-shaped head, the length of the head being made to be substantially the same as the length of the cross-bars 14. The ends or extremities of the long and the short levers 8 and 15 are shaped to present a considerable rise above the main body portion, and the short lever is made of such length that when the arms 16 are positioned over the cross-bars 14, the remaining end does not extend beyond the space confined by the side portions 12 and 13 of the long lever 8.

The arms 9 and 10 of the long lever, the branches 16 of the short lever, and the remaining end of this short lever, have socket bores 17 provided in the lower sides thereof, and cup bearing studs 18 are adapted to be fitted in these socket bores 17 to present the cup bearing ends thereof downwardly, to set in the manner shown in Fig. 3. The bearing shelves 6 and 7 have socket bores 19 therein and cone bearing studs 20 are fitted in these socket bores 18 to present the cone bearing end thereof in such relations that they will be received in the cupped end of the bearing studs 18, when the long and short levers are fitted substantially in the relation shown in Fig. 1. The mounting of the long lever to be supported at one end upon the bearing shelves 6, through the branch arms 9 and 10, disposes this lever to present the bifurcated end thereof adjacent the lower end of the pillar 5, and the mounting of the short lever 15 presents the branches 16 thereof above the cross-bar 14. The cup bearing studs 21 are mounted in the lower sides of the branches 16 adjacent the ends thereof, and cone bearing studs 22 are mounted in correspondingly spaced socket bores in the cross-bar 14 so that at the head end the short lever 15 has bearing upon the cross-bar through the bearing studs.

The mounting of the short lever to have one end thereof bear against the long lever, and the fact that the long lever is fulcrumed at one of its ends will cause weight placed upon either of the levers to affect the same, to move the bifurcated end of the long lever in a swinging path. The weighing platform must therefore be so modeled that it will be supported by the long and short levers, and the free end of the long lever is connected with a steelyard bar, in the manner which will be hereinafter more fully set forth. The legs 4 of platform 3 have socket bores provided therein, and the branch arms 9 and 10 and the body of the short lever 15 are provided with correspondingly positioned socket bores so that proper bearing mounting can be accomplished by the use of the cup bearing studs 23, and the cone bearing studs 24 which are fitted in the socket bores of the legs and of the levers respectively.

A nose iron 25 is fitted upon the bifurcated nose of the long lever 8, and is held in place, adjustingly, by means of a clamp bolt 26 passed through the opening 11 of this lever. A cup bearing stud 27 is carried on the lower side and at one end of the nose iron 25, and a cone bearing stud 28 is mounted in a stirrup 29 shaped to fit around the end of the lever 8 and around the nose iron 25, so that as this cone bearing stud 28 is seated within the cup bearing of the stud 27, the free end of the stirrup is properly lined up. A steelyard rod 30 is connected with this stirrup 29 and is extended to have connection with a steelyard, not shown, in any desired and approved way.

In the use of a scale constructed in the manner of my invention, as weight is placed upon the platform 3, the weight will be transmitted through the legs 4 to bear upon the long and short levers 8 and 15, the latter of which has bearing at one end upon the long lever, and in consequence this long lever will be swung around its mounting on the bearing shelves 6 so that the nose end thereof will be lowered. This movement of the nose end of the lever 8 will cause drawing force to be exerted upon the steelyard rod 30, through the connection established by the use of the stirrup 29, and thus the steelyard will be given proper movement to permit determination of the weight supported upon the platform. When it is desired to make adjustments to accomplish a fine calibration, the nose iron 25 can be shifted by loosening of the clamp screw 26, and when this clamp screw is again tightened down, the nose iron will be secured and fixed in the proper adjustment.

From the foregoing it will be seen that I have provided a scale structure in which the mounting of the platform is accomplished by the use of a comparatively small number of parts, which are of simple construction and in which the greatest accuracy of fitting can be accomplished by the use of comparatively simple jigs, that the provision of cup and cone bearing supports gives a steady mounting to the platform, while at the same time friction is reduced to a minimum due to the fact that a point bearing is accomplished, and that a number of other advantages are accomplished by this particular arrangement and mounting, over the usual type of scales.

While I have herein shown and described only one specific arrangement of the parts, it will of course be understood that changes and variations might be resorted to in adapting the structure for particular types of scales, and that mechanical refinements could be resorted to in the manufacture, without departing from the spirit and scope of my invention, and hence I wish to be limited only to such points as may be set forth in the claims.

I claim:—

1. Scales including a frame having a pillar and steelyard arms arranged in conjunction therewith at one end and provided with an opening through the top at the remaining end, bearing shelves carried by the frame adjacent the opening, a lever mounted to have one of its ends fulcrumed upon the bearing shelves at one of the extremities of the openings, means by which a connection is established from the free end of said lever to the steelyards, a second lever fulcrumed at one end upon a bearing shelf at the remaining extremity of the opening of the frame and at its opposite end bearing upon the first mentioned lever, a platform mounted to be supported solely upon said lever, and cup and cone bearings fitted at the points of mounting of said levers and said platform as well as the connection to the steelyard.

2. Scales including a frame having a steelyard carried thereon, levers mounted in conjunction with the frame and having connection with the steelyard, a platform mounted upon the levers, cup bearing studs provided on the upper member at each point of bearing as the several parts are mounted, and cone bearing studs mounted on the lower member at each bearing point to properly register with the cup bearing studs.

3. In a weighing device, a long lever having an opening intermediate its ends, and one end bifurcated to form a pair of arms, means for supporting the arms with a minimum of friction, means for supporting the other end of the lever from a steelyard, a short lever located in the opening of the larger, means for supporting one end of the short lever from a stationary point for pivotal movement, means for pivotally supporting the other end of the said short lever upon the intermediate portion of the longer lever, and a platform supported upon both levers.

4. In a weighing device, a long lever having a medial slot and one end bifurcated to form diverging arms, depending sockets on the arms, upstanding conical members on the intermediate portion of the lever, conical members to enter the sockets to support the lever, means for supporting the other end from a steelyard, a short lever located in the opening of the first lever, means for supporting in pivotal relation one end of the short lever, a cross bar on the other end of the short lever, depending sockets on said cross bar to receive the conical members of the long lever, and means for supporting a platform upon both levers.

In testimony whereof I affix my signature in presence of two witnesses.

JAMES R. CARY.

Witnesses:
HAROLD R. COURTRIGHT,
JOHN L. CARY.